Patented Jan. 19, 1943

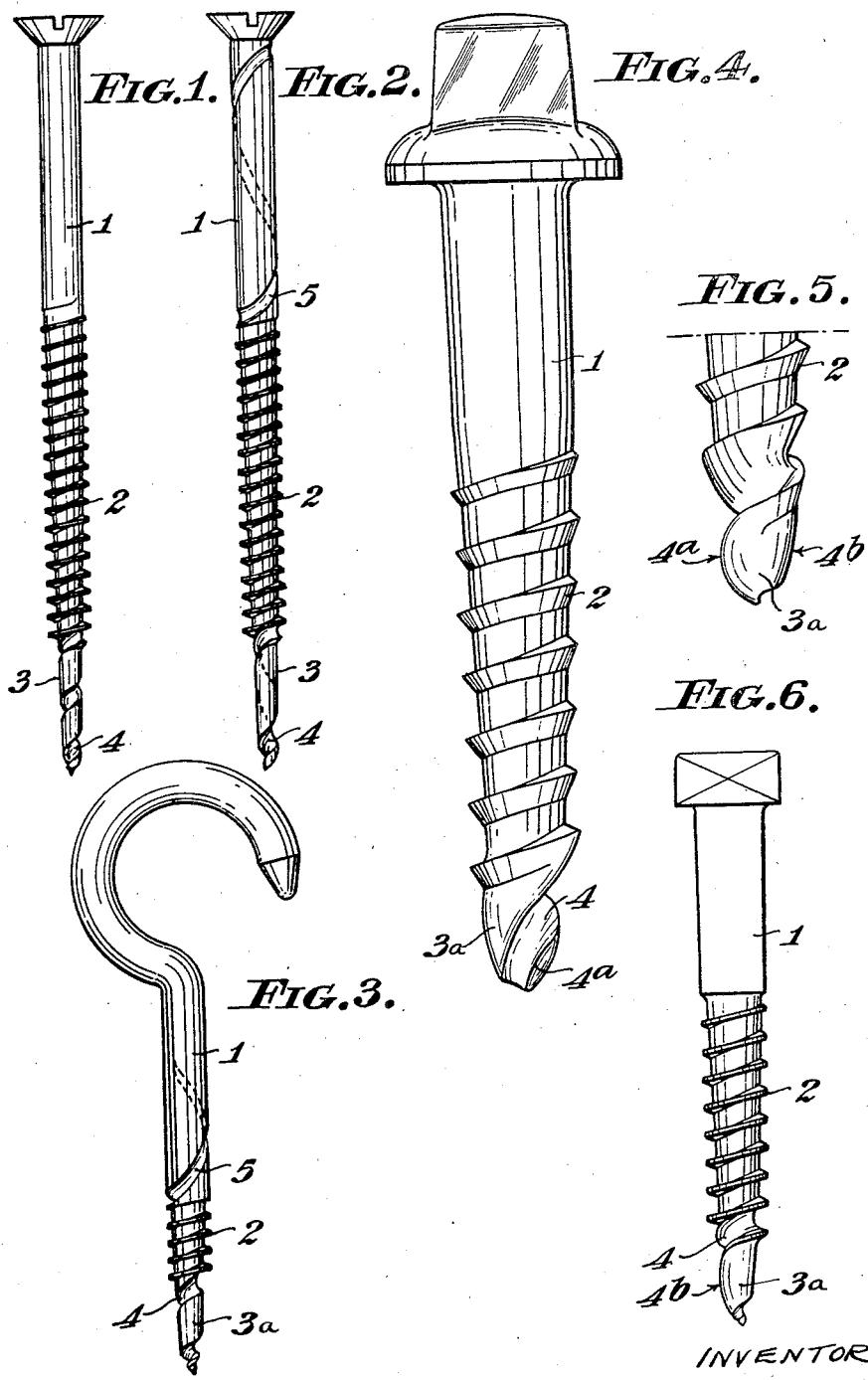

2,308,914

UNITED STATES PATENT OFFICE 2,308,914

SCREW AND THE LIKE

Alfred Gerhold, London, England

Application July 9, 1941, Serial No. 401,660
In Great Britain September 25, 1940

1 Claim. (Cl. 85—46)

This invention relates to improvements in screws and other members such as hooks, which are provided with screw threaded shank portions. The invention relates essentially to screws which are screwed into material or an aperture therein without the preforming of an internal thread, such screws usually being termed wood screws. The primary object of this invention is to provide certain improvements which will facilitate the insertion and screwing up of a screw into the material, and in certain cases without the preforming of a hole therein.

A further object is to provide a screw wherein it is unnecessary to bore any hole before the insertion of the screw, whilst a still further object is to provide a screw which can be screwed easily into wall plugs, as it is constructed to facilitate the initial biting of the screwthread.

In order that a clear understanding of the invention can be obtained, reference will now be made to the accompanying drawing which illustrates preferred examples of the invention and wherein:

Figures 1 and 2 illustrate in elevation an ordinary screw with the improvements according to this invention applied thereto, Figure 3 illustrates an improved form of hook with a screw threaded shank, Figure 4 is an elevation of a screw particularly for use in securing chairs to railway sleepers, Figure 5 is a fragmentary elevation of the side opposite that shown in Figure 4, and Figure 6 is a form of bolt.

In the drawing, the shank portion 1 is provided with a normal or main thread 2, the thread being of any desired or usual form. In Figures 1, 2 and 3 the end 3 thereof is formed with a helical groove 4 which provides a secondary thread of different pitch from the main thread, so that a cutting bit after the nature of the end of a gimlet is formed thereon. It will be understood that this end 3 may be additional to the normal length of the screw, or it may replace some of the normal screwthreads. The pitch is coarse compared with the normal threads. In the examples shown in Figures 2 and 3 the upper plain portion 1 is provided with a helical groove 5 therein starting at the termination of the normal thread which assists in the gripping of the screw and also in the clearing of any cut out material.

Referring now to Figures 4, 5 and 6, the end 3a is of tapering form and is blunt. This end 3 is formed with a helical groove 4 therein, and the leading edge 4a is so formed as to provide a cutter whilst the following edge 4b is smoothed or rounded-off somewhat. It will be understood that the dimensioning of the threads and parts may not follow exactly those shown in the drawing. For example, in Figures 4 and 5 the normal or main threaded portion may be of less diameter or may taper more than is shown. The cutter or bit is intended to form a bore for the shank, so that the bolt can be inserted by means of a tool without previously auguring out a hole and the dimensions will be such as to allow for this.

Obviously, two or more grooved portions may be provided if necessary and in some cases a cutter portion may be formed within the length of the normal thread.

I claim:

A fastening for entering wood and the like, comprising, a shank having a head at one end and formed inwardly of its leading end with a slow main thread of uniform pitch, the portion of the shank below said main thread being formed as a relatively elongated bulbous cutter portion whose outer wall terminates in an axial point, said bulbous portion being provided with a fast thread of steep pitch formed by continuing the valley of the slow thread in the form of a spiral groove which increases in depth as it approaches the said axial point and which groove opens substantially to one side of the axis of said point.

ALFRED GERHOLD.